United States Patent
Bender (10) Patent No.: US 8,061,652 B2
(45) Date of Patent: Nov. 22, 2011

(54) RUDDER OF A COMMERCIAL AIRCRAFT

(75) Inventor: Klaus Bender, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 439 days.

(21) Appl. No.: 12/136,689

(22) Filed: Jun. 10, 2008

(65) Prior Publication Data

US 2010/0140393 A1    Jun. 10, 2010

Related U.S. Application Data

(63) Continuation of application No. PCT/EP2006/011954, filed on Dec. 12, 2006.

(30) Foreign Application Priority Data

Dec. 13, 2005 (DE) .................. 10 2005 059370

(51) Int. Cl.
*B64C 9/00* (2006.01)
(52) U.S. Cl. .................. 244/87; 244/99.2; 244/217
(58) Field of Classification Search .................. 244/87, 244/88, 89, 90 R, 90 A, 99.2, 99.3, 3.3, 110 R, 244/110 D, 110 A, 215–217
See application file for complete search history.

(56) References Cited

U.S. PATENT DOCUMENTS

| | | | |
|---|---|---|---|
| 2,241,335 A | | 5/1941 | Wedberg |
| 2,434,341 A | * | 1/1948 | Anderson ...................... 244/217 |
| 2,643,833 A | * | 6/1953 | Ambroise ...................... 244/226 |
| 3,120,935 A | | 2/1964 | Perrin |
| 4,290,612 A | * | 9/1981 | Frosch et al. .................. 277/345 |
| 6,626,401 B2 | * | 9/2003 | Fraser ............................ 244/221 |
| 2001/0032907 A1 | | 10/2001 | Borchers et al. |
| 2005/0230565 A1 | | 10/2005 | Kallinen |

FOREIGN PATENT DOCUMENTS

| | | |
|---|---|---|
| DE | 723259 | 8/1942 |
| DE | 730606 | 1/1943 |
| EP | 1149761 A1 | 10/2001 |
| EP | 1527992 A2 | 5/2005 |
| FR | 1112264 | 3/1956 |
| GB | 722842 | 2/1955 |
| JP | 02032000 | 1/1990 |
| RU | 46794 A | 3/1935 |
| WO | 20000002775 | 1/2000 |

OTHER PUBLICATIONS

Sakaliyski, Aeroacoustics of Perforated Drag Plates for Quiet Transport Aircraft, Sep. 2005, Massachusetts Institute of Technology, pp. 1-197, Massachusetts, US.
Database WPI Week 200012; Derwent Publications Ltd., London.
Japanese Notice of Allowance, dated Aug. 9, 2011, for Japanese Patent Application No. 2008544858.

* cited by examiner

*Primary Examiner* — Joshua Michener
(74) *Attorney, Agent, or Firm* — Ingrassia Fisher & Lorenz, P.C.

(57) ABSTRACT

A rudder of a commercial aircraft is provided that is divided along its longitudinal direction in at least one region and the parts of the rudder can be spread against the air flow surrounding the aircraft by means of an actuator in order to decelerate the aircraft.

19 Claims, 5 Drawing Sheets

RUDDER OF A COMMERCIAL AIRCRAFT

CROSS-REFERENCE TO RELATED APPLICATIONS

This application is a continuation of International Patent Application No. PCT/EP2006/011954, which application claims priority to German Application No. 10 2005 059 370.4 filed Dec. 13, 2005, which are hereby incorporated by reference in their entirety.

TECHNICAL FIELD

The invention pertains to an aircraft rudder and more particularly to a rudder of a commercial aircraft.

BACKGROUND

As is generally known, the rudder of an aircraft serves for controlling the aircraft about its vertical axis. Modern commercial aircraft utilize brake flaps in order to increase the drag in the landing approach and during the landing. One known solution in this respect is flaps that are arranged on the upper side of the wing between the landing flaps and the rear spar and usually referred to as spoilers. Such flaps can also be used for the roll control and for reducing the lift. In a less common solution, the brake flaps are arranged on the fuselage, usually on the tail. In both instances, the flaps are essentially simple sheets that are set against the flow surrounding the aircraft.

In order to reduce the noise in the approach, it is possible to reduce the noise at the source (engine and airframe) or to increase the distance to the ground in the form of a steeper approach. Due to the increased drag achieved by means of the brake flaps or spoilers, aircraft are able to fly a steeper landing approach such that, among other things, the noise in the approach corridor can be reduced. However, the thusly achieved noise reduction is partially cancelled out by the noise generated by the brake flap itself. The brake flaps are also used for the deceleration during a landing maneuver.

Due to the sound lift/drag ratio (ratio between lift/drag, A/W), the path angle (g), however, is physically limited because an equilibrium between lift, drag, thrust and weight needs to exist for a stationary state of flight.

$$(T-W)/G = \tan g \qquad (1)$$

with $$G = A \qquad (2)$$

results in $$T/G - 1/(A/W) = \tan g \qquad (3)$$

One can quickly ascertain from equation (3) that, once the idle thrust has been reached, the path angle can only be further reduced by increasing the drag. The classic solution to this is the above-described flaps on the upper side of the wing between the landing flaps and the rear spar (spoilers). The disadvantage of this solution is the simultaneous reduction of the lift coefficient (CA) that needs to be compensated with a higher approach speed (v).

$$A = \frac{1}{2}.r\text{Air}.v2.S.CA \qquad (4)$$

However, an increased approach speed has disadvantageous effects on the noise.

One essential mechanism in the development of noise on a brake flap can be seen in that a single, highly pronounced vortex is formed on the edge of the flap. Brake flaps are usually supported on the aircraft on one side and the edge vortex primarily forms on the free edge that lies opposite the supported side.

Although spreading rudders as such are known, for example on the Space Shuttle or model aircraft, such rudders are not used for the landing approach of commercial aircraft, particularly not in variations that make it possible to reduce the aerodynamically generated noise.

In view of the foregoing, it is at least one objective to develop an improved device for increasing the drag in the landing approach of a commercial aircraft. In addition, other objects, desirable features, and characteristics will become apparent from the subsequent summary and detailed description and the appended claims, taken in conjunction with the accompanying drawings and this background.

SUMMARY

This at least one objective, other objectives, desirable features, and characteristics are attained with a rudder of a commercial aircraft. The rudder is divided along its longitudinal direction in at least one region and the parts of the rudder are spreadable against the air flow surrounding the aircraft by means of an actuator for decelerating the aircraft. The rudder has a joint base that is supported articulatedly on the aircraft and is turnable by means of the actuator for the lateral control of the aircraft. The one part of the rudder is supported in an articulated fashion relative to the joint base and is spreadable against the air flow surrounding the aircraft by means of the actuator in order to decelerate the aircraft and one part of the rudder is rigidly connected to the joint base. The part of the rudder that is supported in an articulated fashion is turned relative to the joint base by means of the actuator for spreading the rudder and the part of the rudder that is rigidly connected to the joint base is pivoted toward the opposite side together with the joint base by means of the actuator for the lateral control of the aircraft in order to realize a symmetric excursion of both parts during the spreading of the rudder. Advantageous embodiments and additional developments of the inventive rudder are disclosed in the subsequent summary, detailed description and claimed in the dependent claims.

The rudder for a commercial aircraft in accordance with an exemplary embodiment is characterized in that the rudder is divided along its longitudinal direction in at least one region, and in that the parts of the rudder can be spread against the air flow surrounding the aircraft by means of an actuator in order to decelerate the aircraft.

One significant advantage of this rudder is that the drag can be increased without reducing the lift. Another advantage of the rudder is that a reduction in the aerodynamically generated noise on the ground can be realized in the landing approach of commercial aircraft.

According to an advantageous embodiment, the rudder is divided along its longitudinal direction in the plane of symmetry.

According to another advantageous embodiment, the parts of the rudder can be spread with respect to the plane of symmetry by means of the actuator.

According to another advantageous embodiment, the rudder has a joint base that is supported in an articulated fashion on the aircraft and can be turned by means of an actuator that serves for the lateral control of the aircraft, wherein at least one of the parts of the rudder can the spread against the air flow surrounding the aircraft by means of the spreading actuator in order to decelerate the aircraft.

According to an advantageous embodiment hereof, both parts of the rudder are supported in an articulated fashion relative to the joint base and can be spread against the air flow surrounding the aircraft symmetrically referred to the joint base by means of the spreading actuator in order to decelerate the aircraft.

According to an advantageous embodiment, one part of the rudder is supported relative to the joint base in an articulated fashion and can be spread against the air flow surrounding the aircraft by means of the spreading actuator in order to decelerate the aircraft and one part of the rudder is rigidly connected to the joint base. The part of the rudder that is supported in an articulated fashion is turned relative to the joint base by means of the actuator for spreading the rudder and the part of the rudder that is rigidly connected to the joint base is pivoted toward the opposite side together with the joint base by means of the actuator for the lateral control of the aircraft in order to achieve a symmetric excursion of both parts during the spreading of rudder.

According to an advantageous additional development, a multitude of individual edge sections that break up the edge vortex into a multitude of partial vortexes are realized on the free edge that generates an edge vortex in the air flow surrounding the aircraft during the spreading of the rudder.

According to an advantageous embodiment, the multitude of individual edge sections for breaking up the edge vortex into a multitude of partial vortexes are realized with an undulated design of the free edge.

According to an advantageous embodiment, the individual edge sections for breaking up the edge vortex into a multitude of partial vortexes are realized with a zigzag-shaped design of the free edge.

According to another advantageous embodiment, the individual edge sections for breaking up the edge vortex into a multitude of partial vortexes are realized with holes or recesses provided near the free edge of the parts of the rudder.

According to an advantageous embodiment, the holes or recesses are realized in the form of perforations that extend through the parts of the rudder.

According to an advantageous embodiment, the holes or recesses provided in the parts of the rudder are realized in the form of depressions that are arranged on the outer side of the parts of the rudder and do not extend through the parts of the rudder.

According to another advantageous embodiment, the individual edge sections for breaking up the edge vortex into a multitude of partial vortexes are realized with extensions or projections that are arranged on the surface of the parts of the rudder near the free edge.

According to an advantageous embodiment, the individual edge sections for breaking up the edge vortex into a multitude of partial vortexes are arranged on the rear free edge of the rudder.

Alternatively or additionally, the individual edge sections for breaking up the edge vortex into a multitude of partial vortexes may be arranged on the upper free edge of the rudder.

It would also be possible that the holes or recesses provided in the parts of the rudder are closed in the non-spread state of the rudder.

It would furthermore be possible that the individual edge sections for breaking up the edge vortex into a multitude of partial vortexes that are realized with extensions or projections arranged on the surface of the parts of the rudder near the free edge are retracted in the non-spread state of the rudder.

According to one particularly advantageous embodiment, the rudder is arranged on the aircraft in combination with an elevator unit, wherein the rudder is arranged above the elevator unit (HTP+VTP) such that the aerodynamic noise generated by the rudder in the spread state is attenuated toward the ground by the elevator unit.

BRIEF DESCRIPTION OF THE DRAWINGS

The present invention will hereinafter be described in conjunction with the following drawing figures, wherein like numerals denote like elements, and FIG. 1 is a sectioned top view of a spreading rudder according to one embodiment in the closed state (FIG. 1a)) and in the spread state (FIG. 1b));

FIG. 2 is a sectioned top view of a spreading rudder according to another embodiment in the closed state (FIG. 2a)) and in the spread state (FIG. 2b));

DETAILED DESCRIPTION

The following detailed description is merely exemplary in nature and is not intended to limit application and uses. Furthermore, there is no intention to be bound by any theory presented in the preceding background or the following detailed description.

Figure 1A:
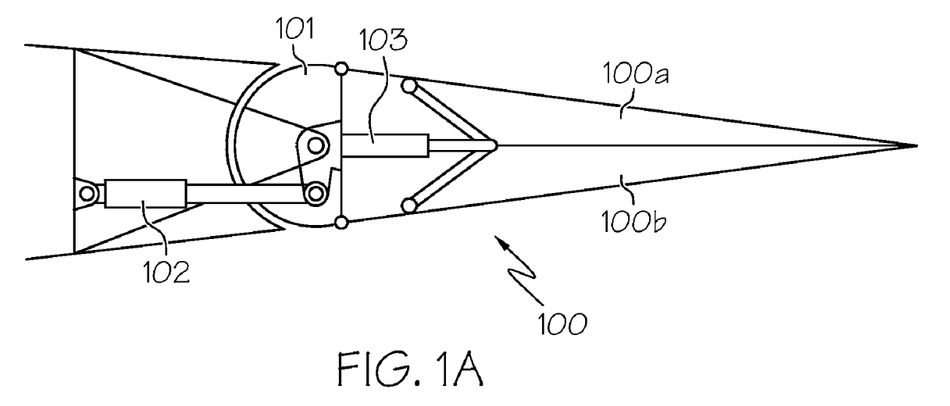
Figure 1B:
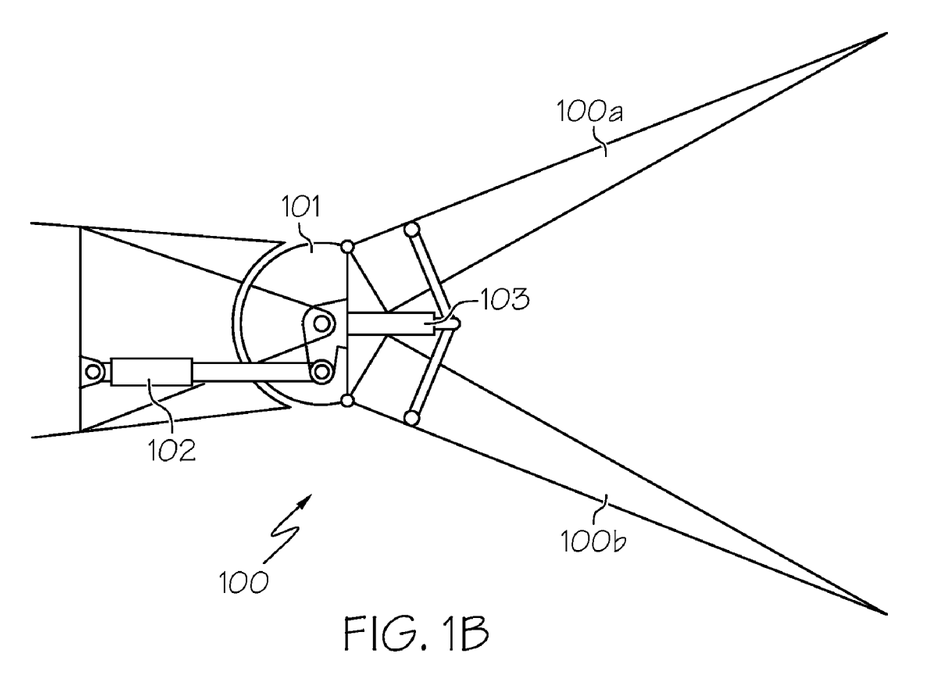
Figure 2A:
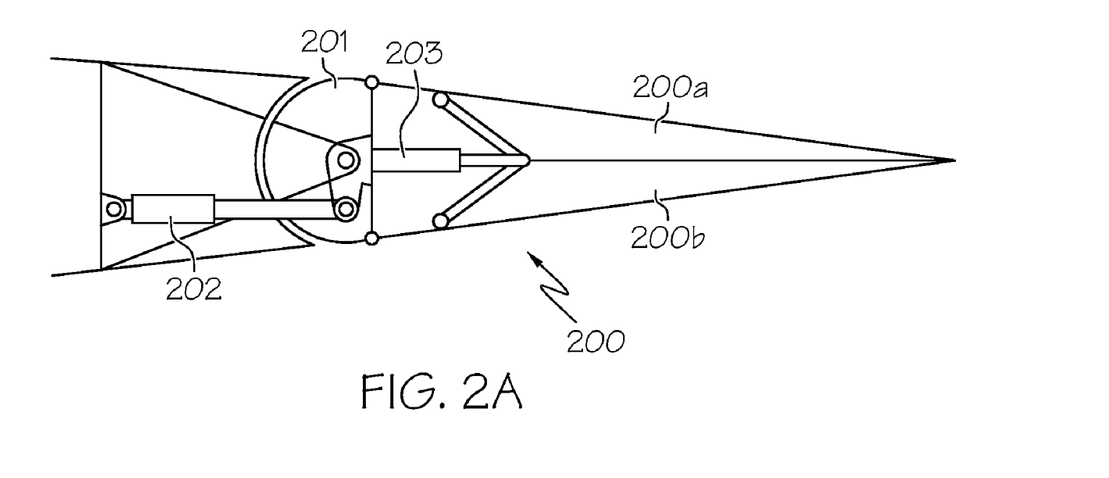
Figure 2B:
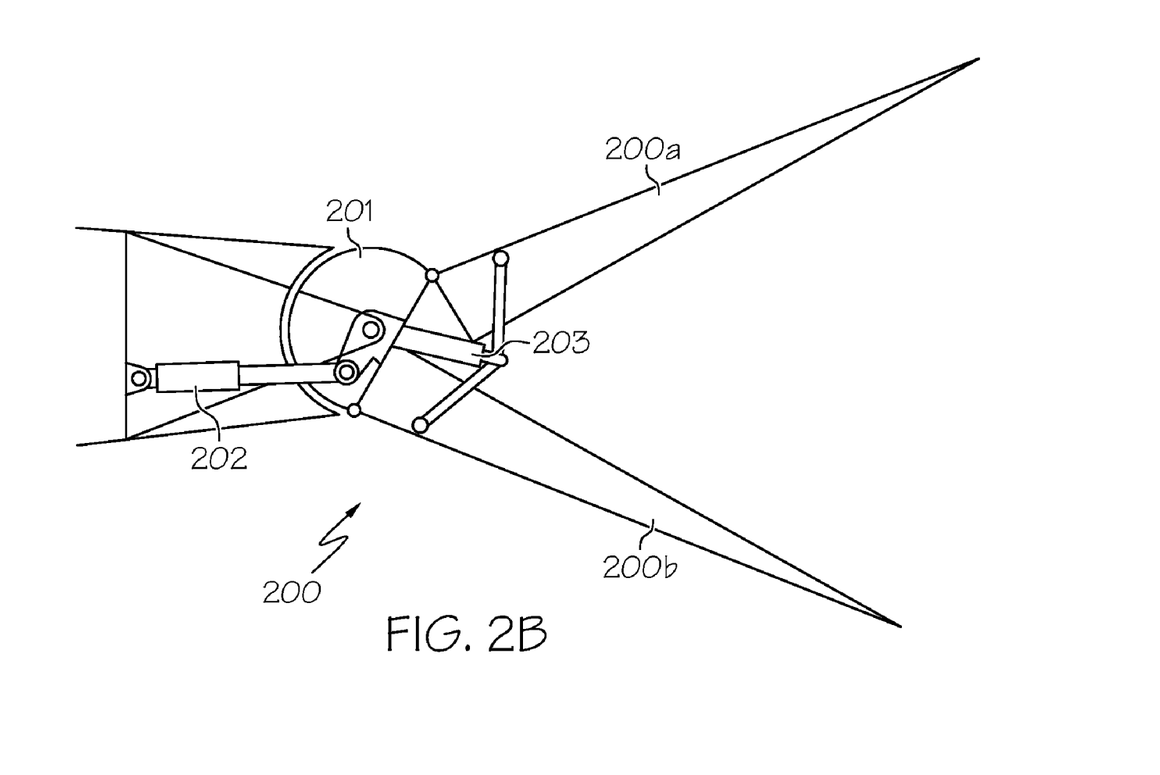

FIGS. 1 and 2 respectively show a sectioned top view of a spreading rudder 100; 200 according to one embodiment in the closed state (FIGS. 1a) and 2a)) and in the spread state (FIGS. 1b), 2b)). The rudder 100; 200 is divided along is longitudinal direction. The parts 100a, 100b; 200a, 200b of the rudder 100; 200 can be spread against the air flow surrounding the aircraft by means of an actuator 103; 203 in order to decelerate the aircraft. In both embodiments, the rudder 100; 200 is divided along its longitudinal direction in the plane of symmetry, and the parts 100a, 100b; 200a, 200b of the rudder 100; 200 can be spread with respect to the plane of symmetry by means of the actuator 103; 203. The spreading of the rudder 100; 200 serves for increasing the drag independently of the lift.

The rudder 100; 200 has a joint base 101; 201 that is supported in an articulated fashion on the aircraft and can be turned by means of an actuator 102; 202 for realizing the lateral control of the aircraft. At least one of the parts 100a, 100b; 200a, 200b of the rudder 100; 200 can be spread against the air flow surrounding the aircraft by means of the actuator 103; 203 in order to decelerate the aircraft.

In the embodiment shown in FIGS. 1a) and b), both parts 100a, 100b of the rudder 100 are supported in an articulated fashion relative to the joint base 101 and can be spread against the air flow surrounding the aircraft symmetrically referred to the joint base 101 by means of the actuator 103 in order to decelerate the aircraft. The pivoting function consequently remains separated from the spreading function.

In the embodiment shown in FIGS. 2a) and b), one part 200a of the rudder 200 is supported in an articulated fashion relative to the joint base 201 and can be spread against the air flow surrounding the aircraft by means of the actuator 203 in order to decelerate the aircraft. One part 200b of the rudder 200 is rigidly connected to the joint base 201. The part 200a of the rudder 200 that is supported in an articulated fashion is turned relative to the joint base 201 by means of the actuator 203 for spreading the rudder 200 and the part 200b of the rudder 200 that is rigidly connected to the joint base 201 is pivoted toward the opposite side together with the joint base 201 by means of the actuator 202 for the lateral control of the aircraft in order to realize a symmetric excursion of both parts 200a, 200b during the spreading of the rudder 200.

In addition, the rudder shape is altered in order to reduce the noise caused by the spreading of the rudder. The rudder 100; 200 of the aircraft is divided in the plane of symmetry behind the joint line and spread by means of the actuator 103; 203. In the design shown in FIG. 1, both halves 100a, 100b of the rudder are rotatable. Both halves 100a, 100b are subjected to a symmetric excursion. In the design shown in FIG. 2, only one half 200a is rotatable. In order to achieve a symmetric excursion, the rudder needs to be simultaneously pivoted at the joint base 201. Alternatively to the presented concepts with an actuator 103; 203 that lies parallel to the rudder, it would also be conceivable to realize a solution with an actuator that extends perpendicularly. The spreading of the rudder 100; 200 makes it possible to increase the drag. The speed does not have to be increased because the lift is not reduced. Due to the arrangement of the rudder unit on the fuselage and the utilization of a normal elevator unit, a shadowing of the noise-generating spreading flap 100a, 100b; 200a, 200b is also achieved.

Figure 3:
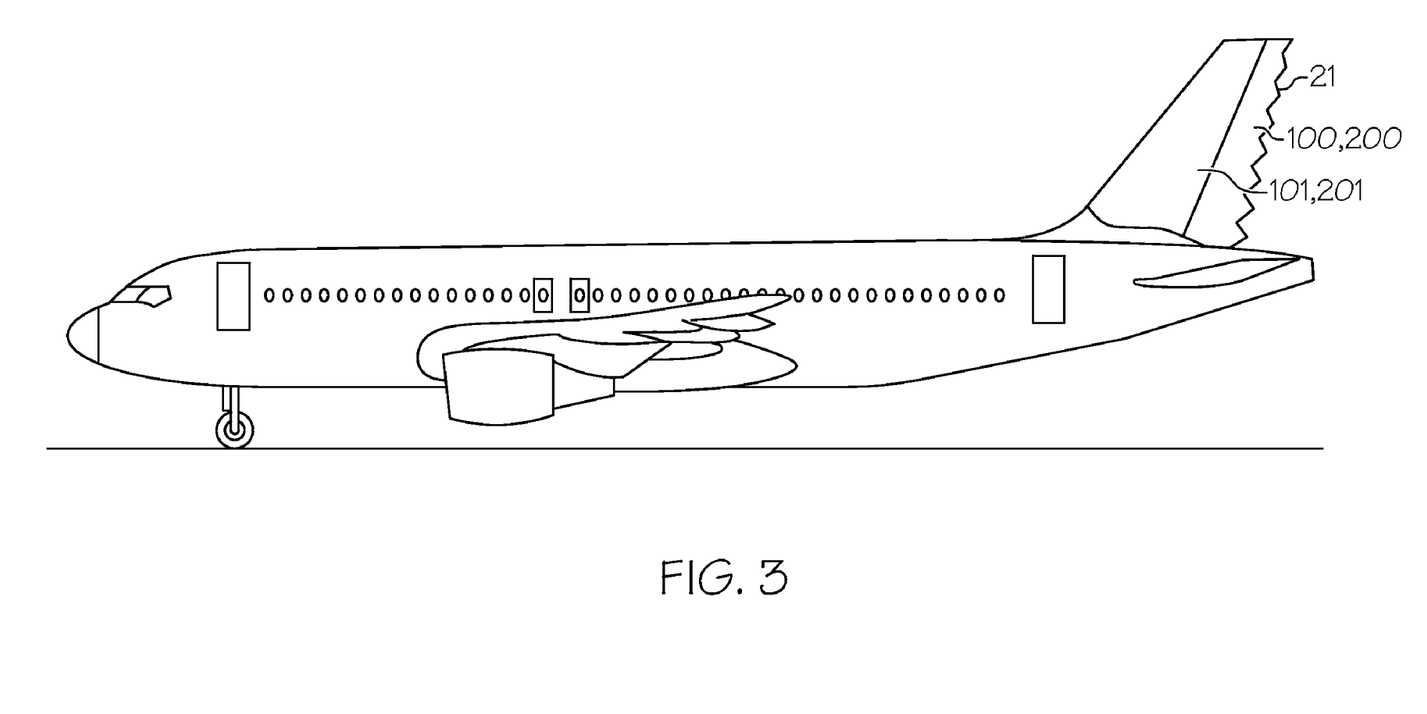
FIG. 3 is a side view of an aircraft with a spreading rudder according to one embodiment.

FIG. 3 shows a side view of an aircraft with a spreading rudder 100; 200 according to one embodiment, wherein the rear free edge 21 of the rudder 100; 200 is divided into individual zigzag-shaped edge sections 22 such that an additional reduction of the noise can be realized according to one embodiment of the invention. This is described in greater detail below.

Figure 4:
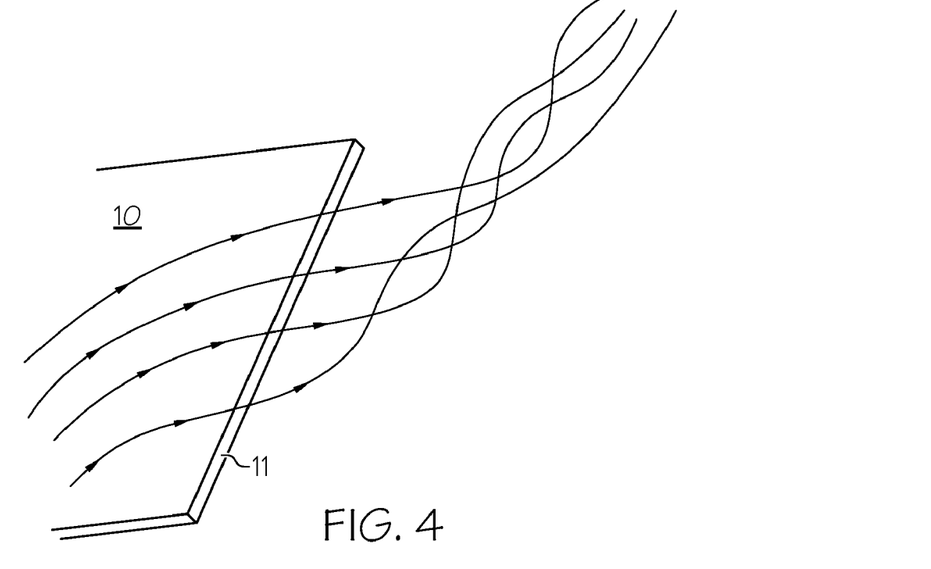
FIG. 4 is a perspective representation of part of a brake flap for an aircraft according to the state of the art that can be set against the air flow surrounding the aircraft in order to decelerate the aircraft.

FIG. 4 shows a perspective representation of part of a conventional brake flap 10 according to the state of the art. The brake flap has a free edge 11 that assumes a certain distance from the skin of the aircraft when the brake flap 10 is set against the air flow surrounding the aircraft and generates an edge vortex therein. This edge vortex is a significant source of noise generated when the brake flap is set against the air flow and can represent an annoyance in the landing approach. Such an edge vortex would also be generated during the above-described spreading of the rudder 100; 200.

Figure 5:
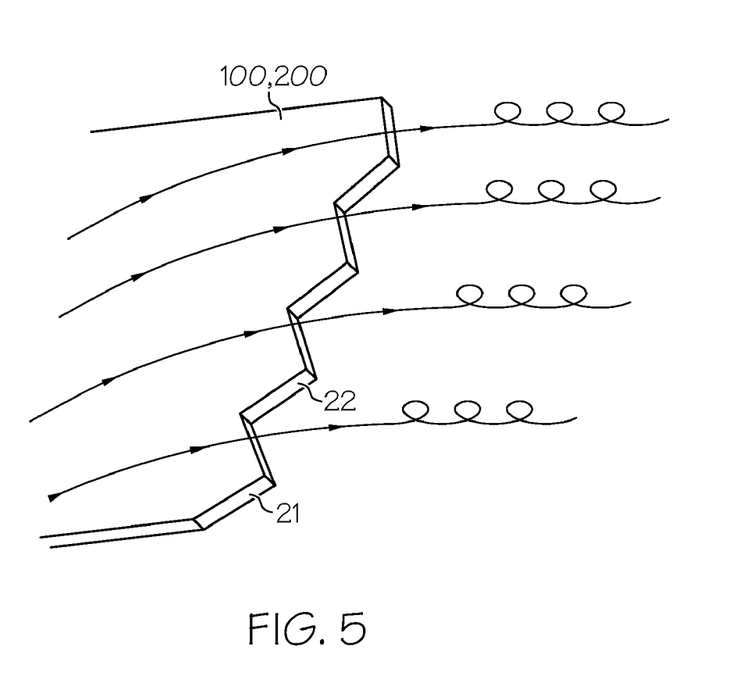
FIG. 5 is a perspective representation of part of the rear free edge of the rudder of an aircraft according to one embodiment.

FIG. 5 shows a perspective representation of the rear free edge of the rudder 100; 200 of an aircraft according to an embodiment, wherein this rudder can be spread against the air flow surrounding the aircraft in order to decelerate the aircraft as described above with reference to FIGS. 1 and 2. The rudder 100; 200 has a free edge 21 that generates an edge vortex in the air flow surrounding the aircraft when the parts 100a, 100b; 200a, 200b of the rudder 100; 200 are spread. According to an exemplary embodiment of the invention, the free edge 21 is provided with a multitude of individual edge sections 22 that break up the edge vortex into a multitude of partial vortexes. In the embodiment according to FIG. 5 that is also designed similar to the above-described embodiment according to FIG. 3, the individual edge sections 22 are realized with a zigzag-shaped design of the free edge 21.

Figure 6A:
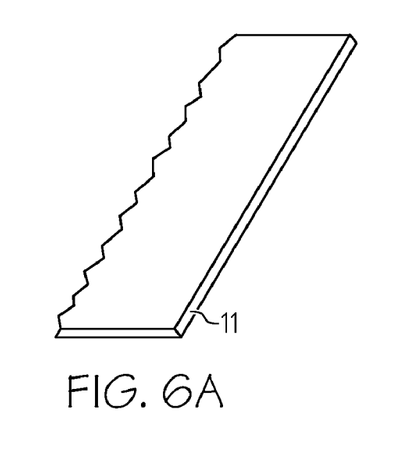
FIGS. 6a) to e) are perspective representations that respectively depict part of the rear free edge of the rudder of an aircraft according to the state of the art (FIG. 6a)) and according to several preferred embodiments (FIGS. 6b) to 6e)), in which the rudder can be spread against the air flow surrounding the aircraft in order to decelerate the aircraft, wherein FIG. 6c) depicts the embodiment that is already illustrated in FIG. 5.
Figure 6B:
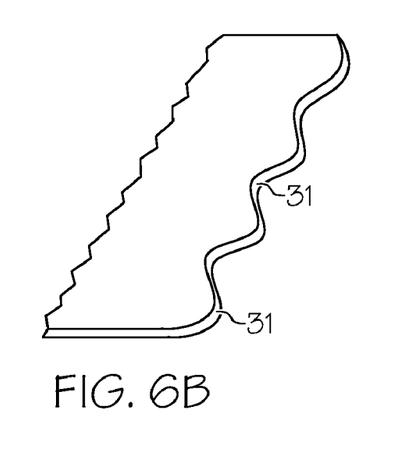

FIG. 6a) shows a perspective representation of the part of the brake flap 10 for an aircraft according to the state of the art that is already illustrated in FIG. 4. FIGS. 6b) to e) respectively show perspective representations of part of the rudder 100; 200 of an aircraft according to several preferred embodiments, in which a multitude of individual edge sections 22; 32; 42; 52 for breaking up the edge vortex into a multitude of partial vortexes are realized on the free edge 21; 31; 41; 51.

In the embodiment shown in FIG. 6b), the individual edge sections 32 for breaking up the edge vortex into a multitude of partial vortexes are realized with an undulated design of the free edge 31.

Figure 6C:
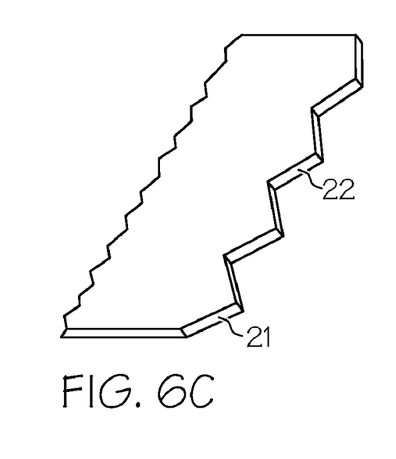

FIG. 6c) once again depicts the embodiment shown in FIG. 5, in which the individual edge sections 22 are realized with a zigzag-shaped design of the free edge 21.

Figure 6D:
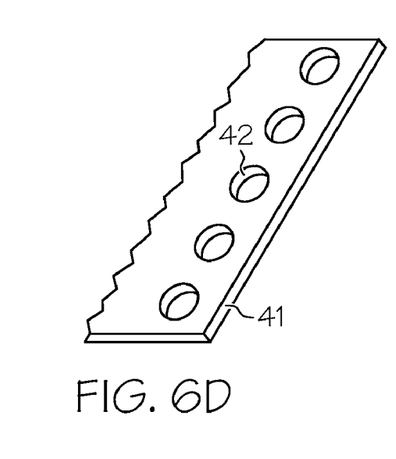

In the embodiment shown in FIG. 6d), the individual edge sections for breaking up the edge vortex into a multitude of partial vortexes are realized with holes or recesses 42 that are arranged in the parts 100a, 100b; 200a, 200b of the rudder 100; 200 near the free edge 41. The holes or recesses 42 may be realized in the form of perforations that extend through the parts 100a, 100b; 200a, 200b of the rudder 100; 200 as in the embodiment according to FIG. 6d) or in the form of depressions that are arranged on the outer side of the parts 100a, 100b; 200a, 200b of the rudder 100; 200 and do not extend through these parts.

Figure 6E:
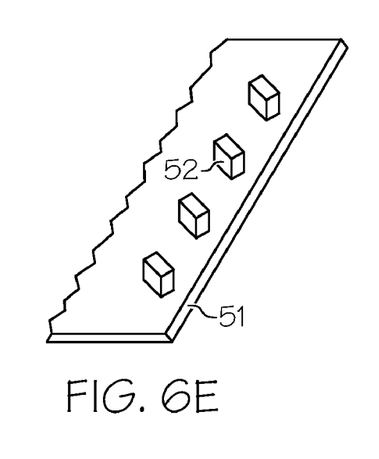

In the embodiment shown in FIG. 6e), the individual edge sections for breaking up the edge vortex into a multitude of partial vortexes are realized with extensions, recesses, protrusions or projections 52 that are arranged on the surface of the parts 100a, 100b; 200a, 200b of the rudder 100; 200 near the free edge 51.

Instead of the embodiments shown, the edge sections that are provided on the free edge of the parts 100a, 100b; 200a, 200b of the rudder 100; 200 and serve for breaking up the edge vortex into a multitude of partial vortexes may also be realized differently, wherein it is important that a multitude of individual smaller edge vortexes is generated instead of the single noise-generating edge vortex shown in FIG. 4, and wherein the individual smaller edge vortexes generate less noise and, if applicable, are even able to dampen or cancelled out one another with respect to the generation of noise. In this context, the term edge sections should be understood in such a way that they are arranged in the vicinity of the edge, but do not necessarily have to be formed by the edge of the parts 100a, 100b; 200a, 200b of the rudder 100; 200 themselves as in the embodiments shown in FIGS. 6b) and c), i.e., they may also be arranged near the edge as in the embodiments shown in FIGS. 6d) and e).

The individual edge sections 22; 32; 42; 52 for breaking up the edge vortex into a multitude of partial vortexes may be provided on the rear free edge 21; 31; 41; 51 of the rudder 100; 200 as shown in FIG. 3, wherein the individual edge sections may be alternatively or additionally provided on the upper edge of the rudder 100; 200.

In the embodiment shown in FIG. 6d), the holes or recesses 42 that are realized in the form of perforations extending through the parts 100a, 100b; 200a, 200b of the rudder 100; 200 can be closed in the non-spread state of the parts 100a, 100b; 200a, 200b of the rudder 100; 200. This can be realized with correspondingly designed shutters or closing elements.

In the embodiment shown in FIG. 6e), the individual edge sections for breaking up the edge vortex into a multitude of partial vortexes that are realized with extensions or projections 52 provided on the surface of the parts 100a, 100b; 200a, 200b of the rudder 100; 200 near the free edge 51 may be retracted in the non-spread state of the parts 100a, 100b;

200a, 200b of the rudder 100; 200. This can be realized with a correspondingly designed mechanism.

The rudder may be completely divided as shown in FIGS. 1 and 2 or only in a region, i.e., it features an integral part that conventionally functions as a rudder and a spreading part with the above-described function. With respect to the spreading part, it is advantageous to utilize the construction shown in FIG. 1 or a similar construction with symmetrically actuated parts 100a, 100b.

In addition it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Reference characters in the claims are not to be interpreted as limitations. Moreover, while at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A rudder of a commercial aircraft, comprising:
   a division along a longitudinal direction of the rudder in at least one region;
   a plurality of flap parts of the rudder spread against an air flow surrounding the commercial aircraft by means of an actuator for decelerating the commercial aircraft;
   a joint base that is supported articulatedly on the commercial aircraft and is turnable by means of the actuator for lateral control of the commercial aircraft;
   a first flap part of the rudder supported in an articulated fashion relative to the joint base and spreadable against the air flow surrounding the commercial aircraft by means of the actuator in order to decelerate the commercial aircraft; and
   a second flap part of the rudder rigidly connected to the joint base,
   wherein the first flap part of the rudder supported in an articulated fashion is turned relative to the joint base by means of the actuator for spreading the rudder and the second part of the rudder that is rigidly connected to the joint base is pivoted toward an opposite side together with the joint base by means of the actuator for the lateral control of the commercial aircraft in order to realize a symmetric excursion of the first part and second part during the spreading of the rudder,
   wherein further the first part includes a first brake flap, the second part includes a secon brake flap, and the first brake flap and the second brake flap are substantially symmetrical.

2. The rudder of claim 1, wherein the division along the longitudinal direction is provided in a plane of symmetry.

3. The rudder of claim 2, wherein the plurality of flap parts of the rudder are spreadable with respect to the plane of symmetry by means of the actuator.

4. The rudder of claim 3, wherein the rudder has a free edge that generates an edge vortex in the air flow surrounding the commercial aircraft during the spreading of the rudder, and wherein a multitude of individual edge sections for breaking up the edge vortex into a multitude of partial vortexes are realized on the free edge.

5. The rudder of claim 1, wherein the rudder is provided on the commercial aircraft in combination with an elevator unit, and wherein the rudder is arranged above the elevator unit such that aerodynamic noise generated by the rudder in a spread state is attenuated toward a ground by the elevator unit.

6. The rudder of claim 3, wherein the rudder has a free edge that generates an edge vortex in the air flow surrounding the commercial aircraft during the spreading of the rudder, and wherein a multitude of individual edge sections for breaking up the edge vortex into a multitude of partial vortexes are realized on the free edge.

7. The rudder of claim 6, wherein the individual edge sections for breaking up the edge vortex into a multitude of partial vortexes are realized with an undulated design of the free edge.

8. The rudder of claim 4, wherein the individual edge sections for breaking up the edge vortex into a multitude of partial vortexes are realized with a zigzag-shaped design of the free edge.

9. The rudder of claim 6, wherein the individual edge sections for breaking up the edge vortex into a multitude of partial vortexes are formed with apertures arranged in at least one of the first and second flap parts near the free edge.

10. The rudder of claim 8, wherein the apertures provided in the at least one of the first and second brake flaps are in a form of perforations that extend through the at least one of the first and second brake flaps.

11. The rudder of claim 9, wherein the apertures provided in the at least one of the first and second flap parts are in the form of depressions that are arranged on an outer side of the at least one of the first and second flap parts and do not extend through the at least one of the first and second flap parts.

12. The rudder of claim 6, wherein the individual edge sections for breaking up the edge vortex into a multitude of partial vortexes are at least one of extensions, recesses, protrusions and projections that are arranged on a surface of the at least one of the first and second flap parts of the rudder near the free edge.

13. The rudder of claim 6, wherein the individual edge sections for breaking up the edge vortex into a multitude of partial vortexes are arranged on a rear free edge of the rudder.

14. The rudder of claim 6, wherein the individual edge sections for breaking up the edge vortex into a multitude of partial vortexes are arranged on a upper free edge of the rudder.

15. The rudder of claim 10, wherein the apertures that are realized in the form of perforations extending through the at least one of the first and second flap parts of the rudder are closed in a non-spread state of the rudder.

16. The rudder of claim 12, wherein the at least one of extensions, recesses, protrusions and projections that are arranged on the surface of the at least one of the first and second flap parts of the rudder near the free edge and break up the edge vortex into a multitude of partial vortexes are retracted in the non-spread state of the rudder.

17. The rudder of claim 6, wherein the rudder is provided on the commercial aircraft in combination with an elevator unit, and wherein the rudder is arranged above the elevator unit such that aerodynamic noise generated by the rudder in a spread state is attenuated toward a ground by the elevator unit.

18. The rudder of claim 14, wherein the rudder is provided on the commercial aircraft in combination with an elevator unit, and wherein the rudder is arranged above the elevator unit such that aerodynamic noise generated by the rudder in a spread state is attenuated toward a ground by the elevator unit.

19. The rudder of claim 14, further comprising shutter elements configured to close each of the perforations extending through the at least one of the first and second flap parts when the rudder is in a non-spread state.

* * * * *